(12) United States Patent
Chan et al.

(10) Patent No.: US 8,878,402 B2
(45) Date of Patent: Nov. 4, 2014

(54) STARTER MOTOR

(75) Inventors: Po Wah Chan, Hong Kong (CN); Wen Ming Jiang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 181 days.

(21) Appl. No.: 13/554,625

(22) Filed: Jul. 20, 2012

(65) Prior Publication Data

US 2013/0020886 A1 Jan. 24, 2013

(30) Foreign Application Priority Data

Jul. 21, 2011 (CN) .......................... 2011 1 0204836

(51) Int. Cl.
*H02K 1/04* (2006.01)

(52) U.S. Cl.
USPC ................................ 310/43; 310/89; 310/239

(58) Field of Classification Search
USPC .......... 310/42–43, 71, 89, 239, 242, 245, 247
See application file for complete search history.

(56) References Cited

U.S. PATENT DOCUMENTS

| | | | |
|---|---|---|---|
| 4,673,836 A * | 6/1987 | Akiyama et al. | 310/239 |
| 5,844,336 A * | 12/1998 | Ohya et al. | 310/80 |
| 6,097,119 A * | 8/2000 | Kuragaki et al. | 310/89 |
| 6,404,093 B1 * | 6/2002 | Bastide et al. | 310/239 |
| 6,787,962 B2 * | 9/2004 | Yagi et al. | 310/245 |
| 7,989,999 B2 * | 8/2011 | Ono et al. | 310/71 |

* cited by examiner

*Primary Examiner* — Thanh Lam
(74) *Attorney, Agent, or Firm* — Muncy, Geissler, Olds & Lowe, P.C.

(57) ABSTRACT

A starter motor for an engine includes a motor casing made of electrically conductive material and an end bracket fixed to one end of the motor casing. The end bracket comprises a base with brush cages integrally formed therewith, brushes mounted in the brush cages and a conductor electrically connected to the brushes and motor casing. The base is a single piece made of electrically insulating material and coaxial mounting holes are formed in the base and motor casing for fasteners to fix the starter motor to a housing of the engine.

13 Claims, 3 Drawing Sheets

STARTER MOTOR

CROSS REFERENCE TO RELATED APPLICATIONS

This non-provisional patent application claims priority under 35 U.S.C. §119(a) from Patent Application No. 201110204836.X filed in The People's Republic of China on Jul. 21, 2011.

FIELD OF THE INVENTION

This invention relates to a motor, and in particular to a starter motor for an internal combustion engine.

BACKGROUND OF THE INVENTION

A traditional starter motor for engine comprises a metal motor casing and a metal end bracket fixed to one end of the casing. Brush cages are respectively fixed to the metal end bracket via rivets. A terminal connects one of the brushes to the metal end bracket which is electrically connected to the metal motor casing. The metal motor casing is fixed and electrically connected to an engine housing to thereby ground the terminal. The other brush is insulated from the end cap and connected to a motor terminal by a lead wire.

However, this kind of traditional end bracket made of metal material, usually aluminum, is very expensive. Furthermore, many components need to be assembled to the end bracket, which is a complicated process.

The objective of the present invention is to provide a new starter motor with an improved end bracket.

SUMMARY OF THE INVENTION

Accordingly, in one aspect thereof, the present invention provides a starter motor for an engine comprising: a motor casing made of electrically conductive material; and an end bracket fixed at one end of the motor casing; wherein the end bracket comprises a base with brush cages integrally formed therewith, brushes mounted in the brush cages and a conductor electrically connecting one of the brushes to the motor casing, and wherein the base is a single piece made of electrically insulating material and coaxial mounting holes are defined in the base and the motor casing for passage of fasteners to engage with a housing of the engine.

Preferably, the motor casing comprises a flange extending radially outwardly, the conductor contacting with the flange directly.

Preferably, addition coaxial mounting holes are respectively defined in the base and the flange for the passage of addition fasteners to thereby fix the end bracket to the motor casing.

Preferably, the conductor is a thin plate sandwiched between the base and the flange of the motor casing.

Preferably, the conductor is fixed with the base by an over mold process.

Preferably, the end bracket further comprises a pair of terminals respectively connected to the brushes, the conductor being connected to one of the terminals, the other terminal being configured for connection to a power source.

Alternatively, the conductor is a wire conductor, one end of which is electrically connected to one of the brushes and the other end is fixed to the flange of the motor casing.

According to a second aspect thereof, the present invention also provides a starter motor assembly comprising: a motor casing made of electrically conductive material; an end bracket fixed at one end of the motor casing, the end bracket comprising a base, brushes mounted on the base and a conductor electrically connecting one of the brushes to the motor casing; an engine housing made of electrically conductive material; and coaxial mounting holes respectively defined in the base and motor casing and fasteners respectively extending through the coaxial mounting holes to engage with the engine housing, wherein the base is made of electrically insulating material.

Preferably, the motor casing comprises a flange extending radially outwardly, the conductor contacting the flange directly.

Preferably, the conductor is a thin plate sandwiched between the base and the flange of the motor casing.

Preferably, the end bracket further comprises a pair of terminals respectively connected to the brushes, the conductor being connected to one of the terminals, the other terminal being configured for connection to a power source.

Preferably, the base is a single piece made of electrically insulating material and comprises brush cages for receiving the brushes therein.

Preferably, the conductor is fixed with the base by an over mold process.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
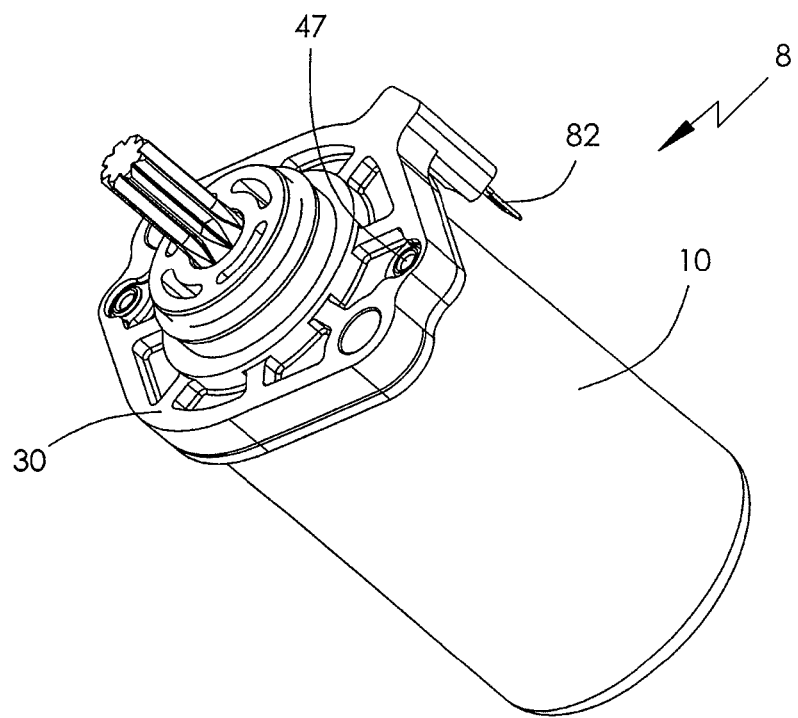
FIG. 1 illustrates a starter motor in accordance with a preferred embodiment of the present invention.

FIG. 1 illustrates a starter motor for an engine according to a preferred embodiment of the present invention. The starter motor comprises a motor casing 10 and an end bracket 30 fixed at one end of the casing 10.

Figure 2:
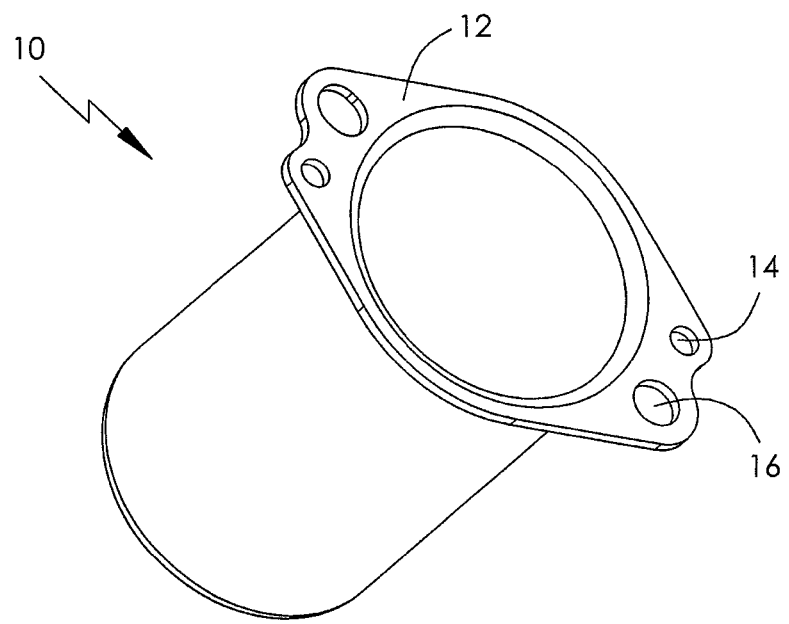
FIG. 2 illustrates a motor housing of starter motor of FIG. 1.

Referring to FIG. 2, the motor casing 10 is made of electrically conductive material such as iron. Specifically, the casing 10 has a cylindrical shape made by deep drawing. The casing 10 comprises a closed end and an open end. A flange 12 extends radially, outwardly from the open end of the casing 10. A pair of first mounting holes 14 and a pair of second mounting holes 16 are formed in the flange 12.

Figure 3:
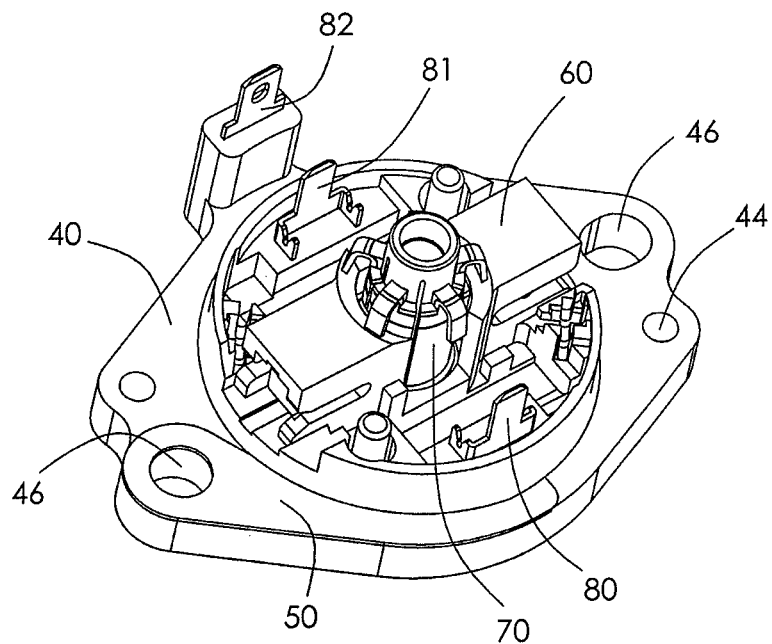
FIG. 3 illustrates an end bracket of the starter motor of FIG. 1.
Figure 4:
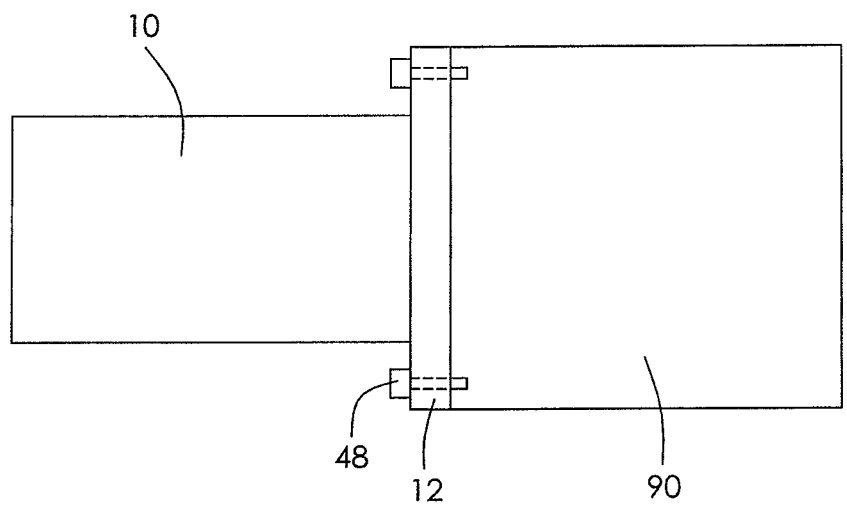
FIG. 4 illustrates the starter motor of FIG. 1 mounted to an engine.

Referring to FIG. 3, the end bracket 30 fixed at the open end of the casing 10 comprises a base 40 made of electrically insulating material and a conductor 50. The base 40 defines a pair of first mounting holes 44 corresponding to the first mounting holes 14 of the casing 10 and a pair of second mounting holes 46 corresponding to the second mounting holes 16 of the casing 10. A pair of first fasteners 47 (see FIG. 1) such as rivets extend through the coaxial first mounting holes 14, 44 to thereby fix the end bracket 30 to the casing 10. A pair of second fasteners 48 (see FIG. 4) extend through the coaxial second mounting holes 16, 46 and engage with a housing 90 of engine. The fasteners 48 are made of electrically conductive material. The base 40 further comprises a pair of brush cages 60 for slidably receiving brushes 62 therein. The brushes 62 are configured to slidably contact a commutator 70 for supplying current to windings connected to the commutator 70. Preferably, the base 40 including the brushes cages 60 is integrally formed as a single piece. Preferably, the base is a monolithic plastic injection molding.

The end bracket 40 further comprises a pair of terminals 80, 81 respectively connected to the brushes 62. One terminal 80 for grounding is connected to or forms the conductor 50. The distal end 82 of the other terminal 81 extends outside of the end bracket 30 to connect to an external power source.

The conductor 50 is arranged at one side of the base 40 close to one of the second mounting holes 46. In this embodiment, the conductor 50 is a thin plate. Preferably, the mounting hole passes through the conductor. Preferably, the base 40 and the conductor 50 are fixed together by an over mold process. During assembly, the base 40 of the end bracket 30 is fixed to the motor casing by first fasteners 47. The conductor 50 is sandwiched between the base 40 and the flange 12 of the casing 10. Second fasteners 48 extend through the coaxial second mounting holes 16, 46 and pass through a hole formed in the conductor 50 to engage with the housing 90 of the engine. Thus, the grounding terminal 80 connected with one of the brushes 62 is grounded via the conductor 50, casing 10, fastener 48 and the housing 90 of the engine.

Alternatively, the conductor 50 may be attached on the side of the base 40 remote from the motor casing 10. The conductor 50 is electrically connected to the housing 90 of the engine by direct contact, being clamped to the engine housing by the fastener 48 which extends through a hole formed in the conductor 50.

Figure 5:
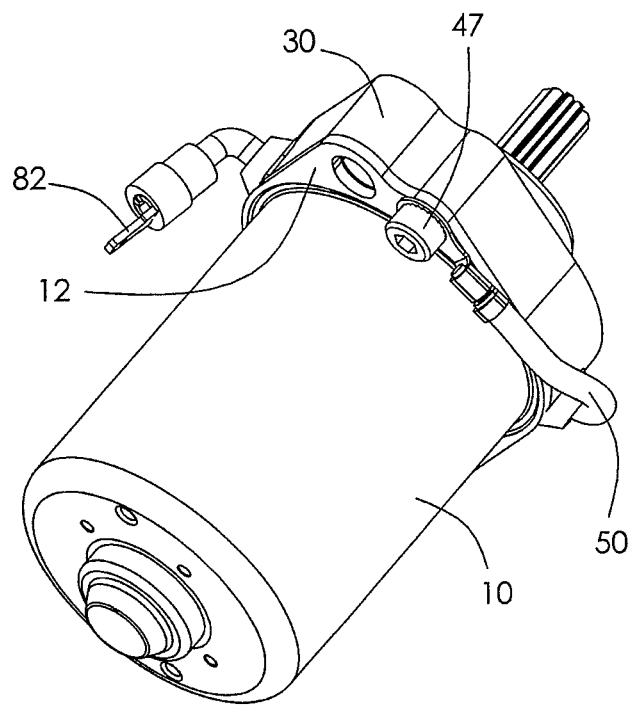
FIG. 5 illustrates a starter motor in accordance with an alternative embodiment of the present invention.
Figure 6:
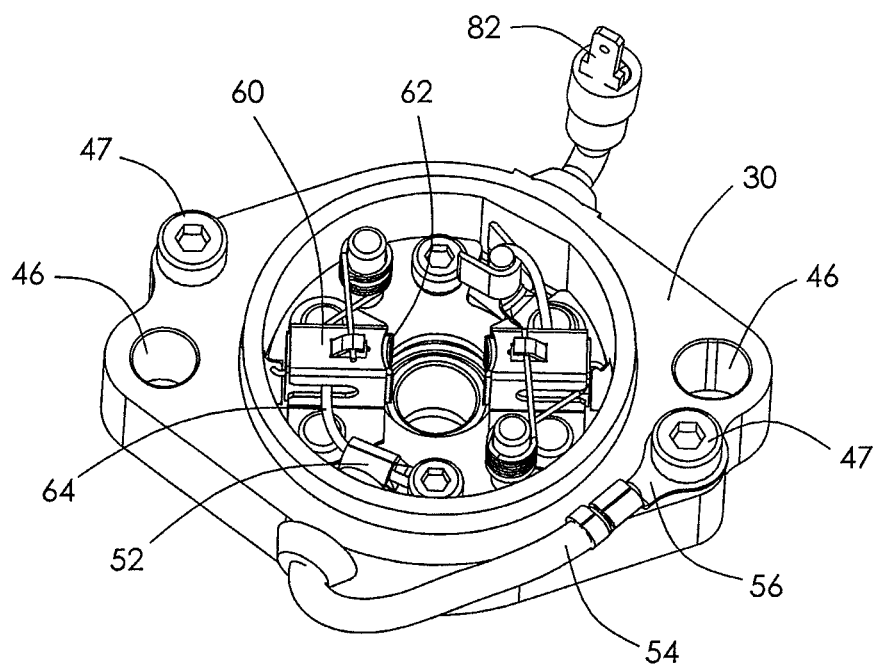
FIG. 6 illustrates an end bracket of the starter motor of FIG. 5.

FIGS. 5 & 6 show a starter motor in accordance with an alternative embodiment of the present invention. The starter motor of the alternative embodiment is similar to the starter motor described above except that the conductor 50 of this embodiment is a wire conductor, one end 52 of which is connected to a shunt 64 of one of the brushes 62 and the other end 54 is fitted with a terminal lug having a through hole defined therein. The other end 54 extends outside of the end bracket 30 and the terminal lug contacts the flange 12 of the motor casing 10. Fastener 47 extends through the through hole of the terminal lug 56, mounting hole 16 of the flange 12 and is threadingly engaged in the through hole 46 of the base 40. Thus, the brush 60 is grounded via the conductor 50 to the motor casing 10 and fastener 48 grounds the motor casing to the engine housing 90.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A starter motor for an engine comprising:
   a motor casing made of electrically conductive material; and
   an end bracket fixed at one end of the motor casing;
   wherein the end bracket comprises a base with brush cages integrally formed therewith, brushes mounted in the brush cages and a conductor electrically connecting one of the brushes to the motor casing, and
   wherein the base with the brush cages is a single piece with a monolithic structure made of electrically insulating material and coaxial mounting holes are defined in the base and the motor casing for passage of fasteners to engage with a housing of the engine.

2. The starter motor of claim 1, wherein the motor casing comprises a flange extending radially outwardly, the conductor contacting with the flange directly.

3. The starter motor of claim 2, wherein addition coaxial mounting holes are respectively defined in the base and the flange for the passage of addition fasteners to thereby fix the end bracket to the motor casing.

4. The starter motor of claim 2, wherein the conductor is a thin plate sandwiched between the base and the flange of the motor casing.

5. The starter otor of claim 4, wherein the conductor is fixed with the base by an over mold process.

6. The starter motor of claim 4, wherein the end bracket further comprises a pair of terminals respectively connected to the brushes, the conductor being connected to one of the terminals, the other terminal being configured for connection to a power source.

7. The starter motor of claim 2, wherein the conductor is a wire conductor, one end of which is electrically connected to one of the brushes and the other end is fixed to the flange df the motor casing.

8. A starter motor assembly comprising:
   a motor casing made of electrically conductive material;
   an end bracket fixed at one end of the motor casing, the end bracket comprising a base, brushes mounted on the base and a conductor electrically connecting one of the brushes to the motor casing;
   an engine housing made of electrically conductive material; and
   coaxial mounting holes respectively defined in the base, conductor and motor casing and fasteners respectively extending through the coaxial mounting holes to engage with the engine housing,
   wherein the base is made of electrically insulating material.

9. The starter motor assembly of claim 8, wherein the motor casing comprises a flange extending radially outwardly, the conductor contacting the flange directly.

10. The starter motor assembly of claim 9, wherein the conductor is a thin plate sandwiched between the base and the flange of the motor casing.

11. The starter motor assembly of claim 10, wherein the end bracket further comprises a pair of terminals respectively connected to the brushes, the conductor being connected to one of the terminals, the other terminal being configured for connection to a power source.

12. The starter motor assembly of claim 8, wherein the base is a single piece made of electrically insulating material and comprises brush cages for receiving the brushes therein.

13. The starter motor assembly of claim 8, wherein the conductor is fixed with the base by an over mold process.

* * * * *